United States Patent [19]

Miyazaki

[11] Patent Number: 5,510,605
[45] Date of Patent: Apr. 23, 1996

[54] BAR CODE READER HAVING MEANS FOR SWITCHING BETWEEN DRIVES OF A PLURALITY OF SEMICONDUCTOR LASER DIODES AT HIGH SPEED

[75] Inventor: Hiroyuki Miyazaki, Tokyo, Japan

[73] Assignee: NEC Corporation, Tokyo, Japan

[21] Appl. No.: 364,268

[22] Filed: Dec. 27, 1994

[30] Foreign Application Priority Data

Dec. 28, 1993 [JP] Japan ................................ 5-335681

[51] Int. Cl.$^6$ ....................................... G06K 7/10
[52] U.S. Cl. ............................ 235/467; 235/462
[58] Field of Search .................... 235/462, 467

[56] References Cited

U.S. PATENT DOCUMENTS 4,816,569  3/1989  Bianco ............................ 235/462
5,028,770  7/1991  Miyazaki et al. .

FOREIGN PATENT DOCUMENTS

1228076  9/1989  Japan .

Primary Examiner—Harold Pitts
Attorney, Agent, or Firm—Sughrue, Mion, Zinn, Macpeak & Seas

[57] ABSTRACT

A plurality of semiconductor laser diodes are disposed so as to emit laser beams whose optical axes extend in different directions. The laser beam emitted from the plurality of semiconductor laser diodes is deflected by a polygon mirror and then reflected by pattern forming mirrors, to thereby form a combined scanning pattern. Although the combined scanning pattern consists of a plurality of cross patterns that are arranged as connected without being overlapped with each other, it actually has the same reading area as a single large cross pattern. Scattered light produced by scanning a bar code symbol by means of the combined scanning pattern is subjected to photoelectric conversion, and a resulting signal is decoded. To form the combined scanning pattern, the rotational angle of the polygon mirror is detected and drives of the plurality of semiconductor laser diodes are switched at high speed based on the detection result.

19 Claims, 8 Drawing Sheets

8, PATTERN FORMING MIRROR
7, PATTERN FORMING MIRROR
54, BEAM LOCUS
51, BEAM LOCUS
53, BEAM LOCUS
52, BEAM LOCUS

BAR CODE READER HAVING MEANS FOR SWITCHING BETWEEN DRIVES OF A PLURALITY OF SEMICONDUCTOR LASER DIODES AT HIGH SPEED

BACKGROUND OF THE INVENTION

1. Field of the Invention

The present invention relates to a bar code reader for physical distribution system and a POS (point of sale) system etc.

2. Description of the Related Art

A conventional bar code reader of the above type is, for instance, disclosed in Japanese Unexamined Patent Publication No. Hei. 1-228076 (published Sep. 12, 1989). This conventional bar code reader will be described with reference to FIG. 1.

Figure 1:
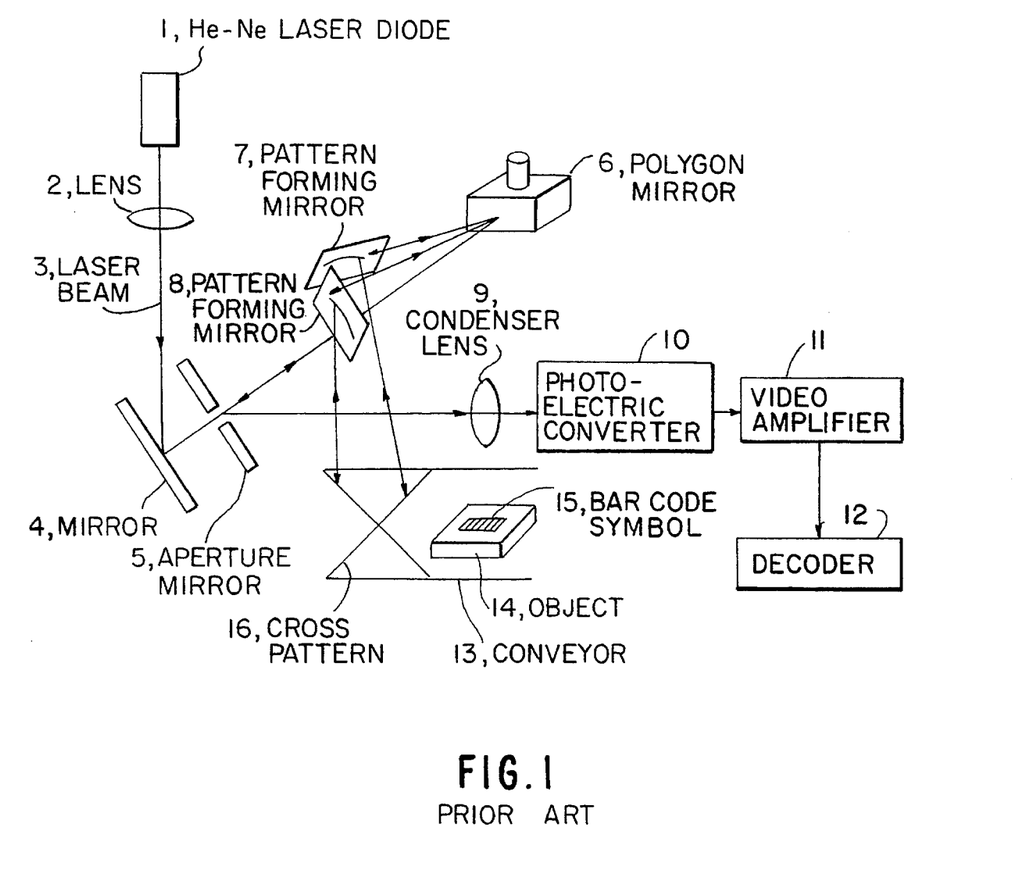
FIG. 1 shows a configuration of a conventional bar code reader.

In FIG. 1, a lens 2 converges a laser beam 3 emitted from a He-Ne laser diode 1. A mirror 4 folds the converged laser beam 3 toward a polygon mirror 6 (described later). An aperture mirror 5, which has an aperture for passing the laser beam 3 folded from the mirror 4, is disposed between the mirror 4 and the polygon mirror 6. The polygon mirror 6, which is a rotary mirror shaped like a polygonal prism, reflects the laser beam 3 passed through the aperture mirror 5. Pattern forming mirrors 7 and 8 reflect the laser beam 3 deflected by the rotating polygon mirror 6 so as to form an X-shaped cross pattern 16 on a surface of an object 14 having a bar code symbol to be read that is conveyed on a conveyor 13. The bar code symbol 15 is scanned by the laser beam 3 in a crossed pattern (cross pattern 16), and reflected light, i.e., scattered light is reflected by the pattern forming mirrors 7 and 8, the polygon mirror 6, and then the aperture mirror 5. A condenser lens 9 condenses the scattered light as reflected by the aperture mirror 5. A photoelectric converter 10 photoelectrically converts the scattered light. A signal obtained by the photoelectric conversion is amplified by a video amplifier 11, and recognized by a decoder 12.

The cross pattern 16 is wide enough to cover the width of the conveyor 13 to allow the bar code symbol 15 to be read omnidirectionally. The decoder 12 recognizes data that is obtained by scanning the bar code symbol 15 from its starting end to stopping end at one time. In this case, the conveying intervals between the objects 14 to be read cannot be shorter than the scanning width of the cross pattern 16.

However, where a necessary scanning width, which is relatively large, is provided by one cross pattern 16, the conveying intervals between the objects 14 to be read become approximately equal to the scanning width, which means a very low conveying efficiency.

Figure 2:
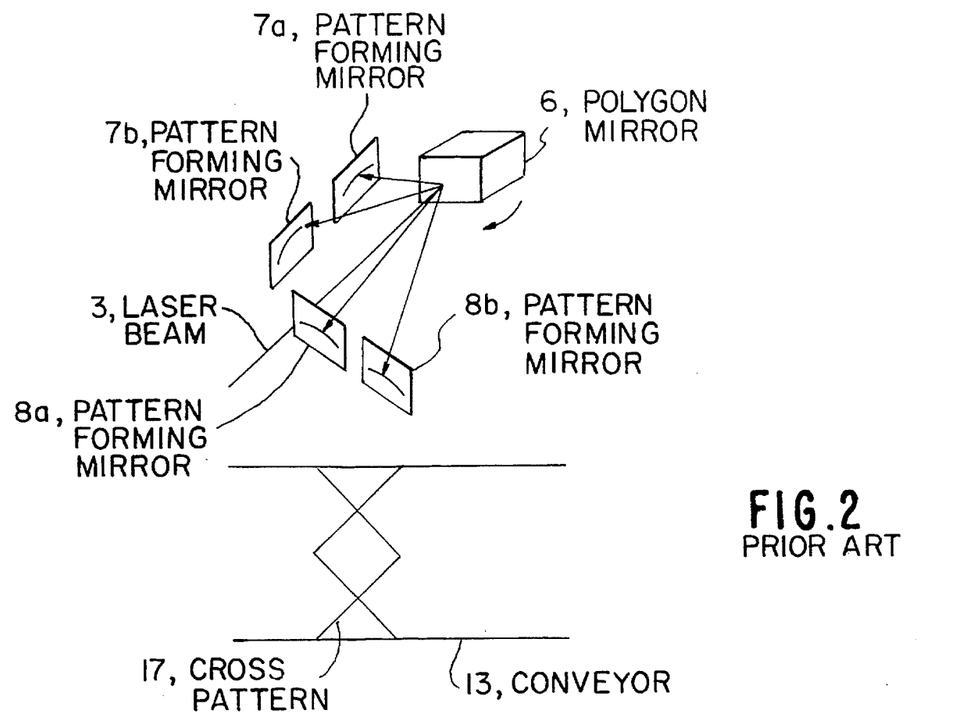
FIG. 2 shows a configuration of another conventional bar code reader.

An attempt has been made in which the conveying intervals between the objects 14 to be read are reduced by half to improve the conveying efficiency. As shown in FIG. 2, the pattern forming mirrors 7 and 8 are halved into four pattern forming mirrors 7a, 7b, 8a and 8b, and their orientations are slightly changed to change reflecting directions of the laser beam 3. As a result, there are obtained two cross patterns 17 having a half width of the cross pattern 16. Since the width of the cross pattern is halved, the conveying intervals can also be halved.

Figure 3:
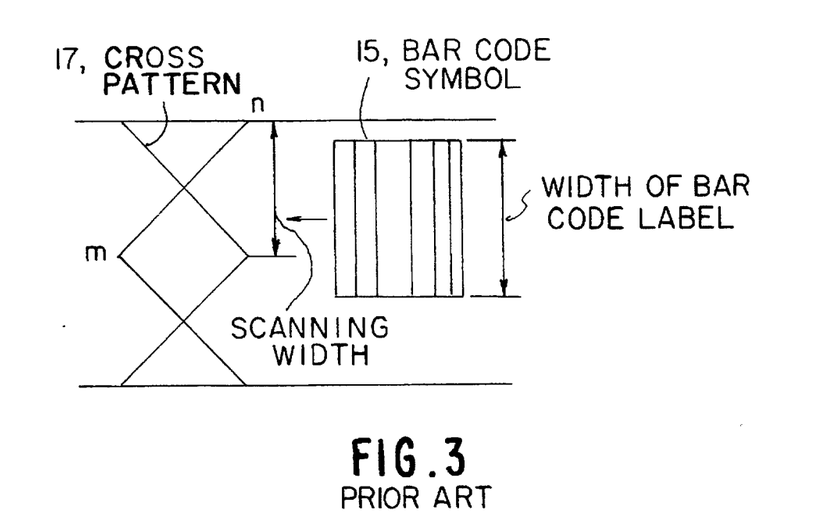
FIG. 3 illustrates a problem of the conventional bar code reader of FIG. 2.

However, where the scanning is performed by using two or more, smaller cross patterns to reduce the conveying intervals between the objects 14 to be read, straight scanning line portions necessarily become shorter. Therefore, there arises a problem that a large bar code symbol 15 that is not covered by the straight scanning line portions cannot be scanned at one time. In an example shown in FIG. 3, in which the scanning is performed by using two cross patterns, a bar code symbol whose width is larger than a straight line scanning length mn cannot be read by one scanning operation.

Further, since the fixed mirrors for pattern formation become shorter, a larger part of a video signal is occupied by shading portions. As a result, a correct reading operation can not be performed. In addition, the configuration of the optical system becomes very complex.

Another conventional bar code reader is disclosed in U.S. Pat. No. 5,028,770 (patented Jul. 2, 1991). In this bar code reader, a plurality of semiconductor laser light sources are driven so as to be switched for respective reflecting facet of a rotary polygon mirror. Scattered light beams reflected from a bar code symbol obtained with the respective light sources are added together, and introduced, as a single reflected light beam, to one photoelectric transducer. This bar code reader has advantages that the density of scanning patterns can be increased, and that the apparatus can be made thinner.

SUMMARY OF THE INVENTION

An object of the present invention is to provide a bar code reader capable of reading a bar code symbol omnidirectionally at one time and, thus, of greatly reducing conveying intervals between conveyed objects on which bar code symbols are attached.

To attain the above object, a bar code reader according to the invention has a plurality of semiconductor laser diodes so disposed as to emit laser beams whose optical axes extend in different directions. The laser beams emitted from the plurality of semiconductor laser diodes are deflected by a deflecting means such as a polygon mirror and then reflected by pattern forming mirrors, to thereby form a combined scanning pattern. Although the combined scanning pattern consists of a plurality of cross patterns that are arranged without being overlapped with each other, it actually has the same reading area as a single large cross pattern. Scattered light produced by scanning a bar code symbol by means of the combined scanning pattern is subjected to photoelectric conversion, and a resulting signal is decoded. In the invention, to form the combined scanning pattern, the rotational angle of the polygon mirror is detected and drives of the plurality of semiconductor laser diodes are switched at high speed based on the detection result.

In the bar code reader according to the invention having the above constitution, by using the semiconductor laser diodes that can be switched at high speed, an arbitrary scanning pattern can be obtained which allows a bar code symbol to be read at one time. Therefore, the reading performance of the bar code reader can be greatly improved.

Further, by increasing the number of semiconductor laser diodes, the conveying intervals between objects to be read can be reduced. As a result, the conveying ability of a conveyor system can be greatly improved.

BRIEF DESCRIPTION OF THE DRAWINGS

The present invention will be described in further detail with reference to the accompanying drawings, in which.

DESCRIPTION OF THE PREFERRED EMBODIMENTS

A bar code reader according to an embodiment of the present invention will be described in detail with reference to FIGS. 4–8.

Figure 4:
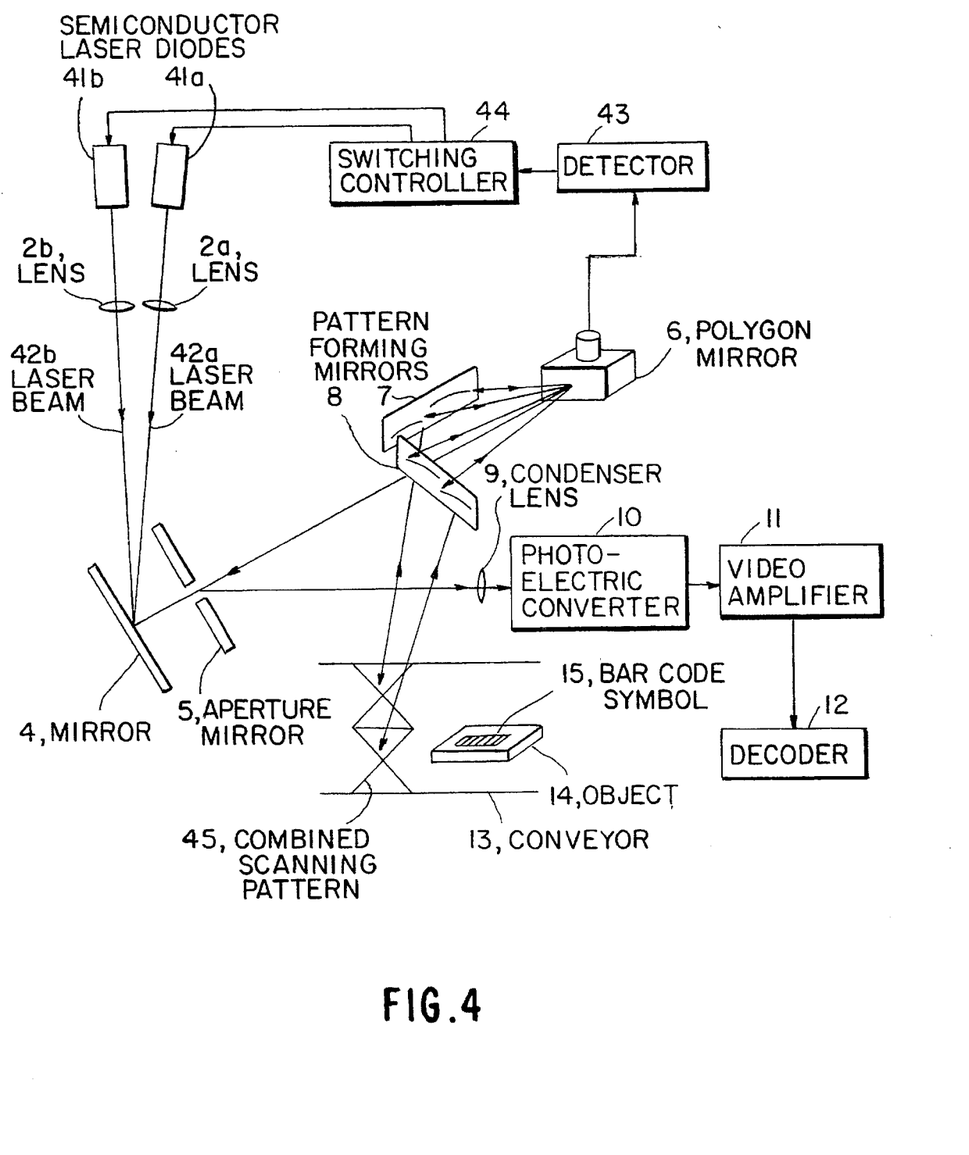
FIG. 4 shows a configuration of a bar code reader according to a first embodiment of the present invention.
Figure 11:
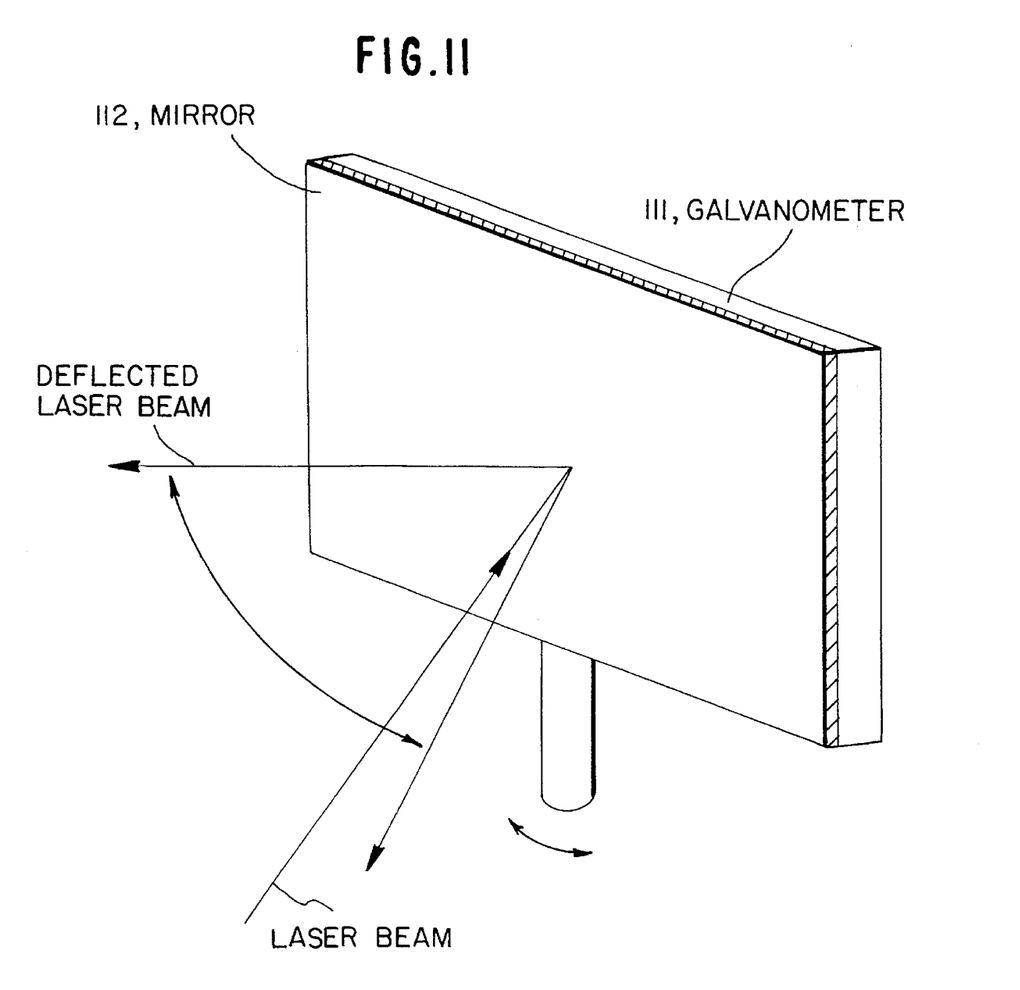
FIG. 11 shows a configuration of another deflecting means of the invention.

In FIG. 4, outputs of laser beams 42a and 42b from semiconductor laser diodes 41a and 41b are switched at high speed according to the control signals sent from a switching controller 44 (described later). The semiconductor laser diodes 41a and 41b are so disposed that optical axes of the laser beams 42a and 42b do not coincide with each other. Lenses 2a and 2b converge the laser beams 42a and 42b emitted from the semiconductor laser diodes 41a and 41b, respectively. A mirror 4 folds the converged laser beams 42a and 42b toward a direction in which a polygon mirror 6 is disposed. An aperture mirror 5, which is disposed between the mirror 4 and the polygon mirror 6, has an aperture for passing the laser beams 42a and 42b folded from the mirror 4. The polygon mirror 6, which is a rotary mirror shaped like a polygonal prism, deflects the laser beams 42a and 42b passed through the aperture mirror 5. Pattern forming mirrors 7 and 8 reflect the laser beams 42a and 42b deflected by the rotating polygon mirror 6 so as to form a combined scanning pattern 45 on a surface of an object 14 having a bar code symbol to be read that is conveyed on a conveyor 13. The bar code symbol is scanned by the laser beam 3 in a crossed pattern combined scanning pattern 45, and reflected light, i.e., scattered light is reflected by the pattern forming mirrors 7 and 8, the polygon mirror 6, and then the aperture mirror 5. A condenser lens 9 condenses the scattered light as reflected by the aperture mirror 5. A photoelectric converter 10 photoelectrically converts the- scattered light. A signal obtained by the photoelectric conversion is amplified by a video amplifier 11, and recognized by a decoder 12. A sync signal detector 43 detects a sync signal that is produced in association with rotary driving of the polygon mirror 6. Based on the sync signal thus detected, a switching controller 44 controls the semiconductor laser diodes 41a and 41b so as to switch between their laser beam outputs at high speed. While in this embodiment the polygon mirror 6 is used as the deflecting means, the deflecting means may be in other forms; for instance, a reflecting mirror 112 mounted on a galvanometer 111 shown in FIG. 11.

Figure 5A:
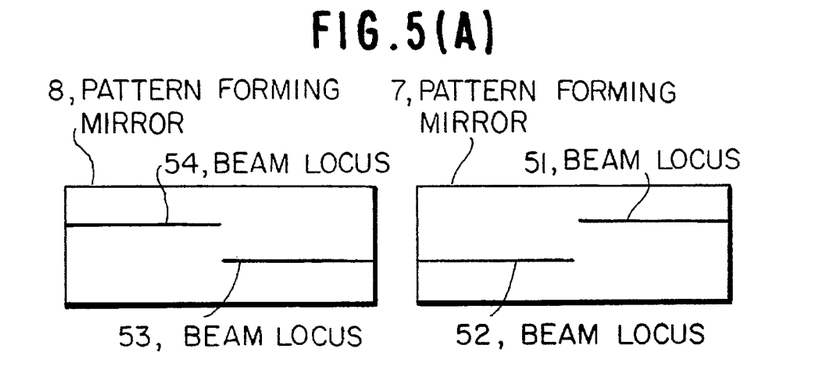
FIGS. 5(A) and 5(B) illustrate a process of forming a combined scanning pattern in the first embodiment of the invention.
Figure 5B:
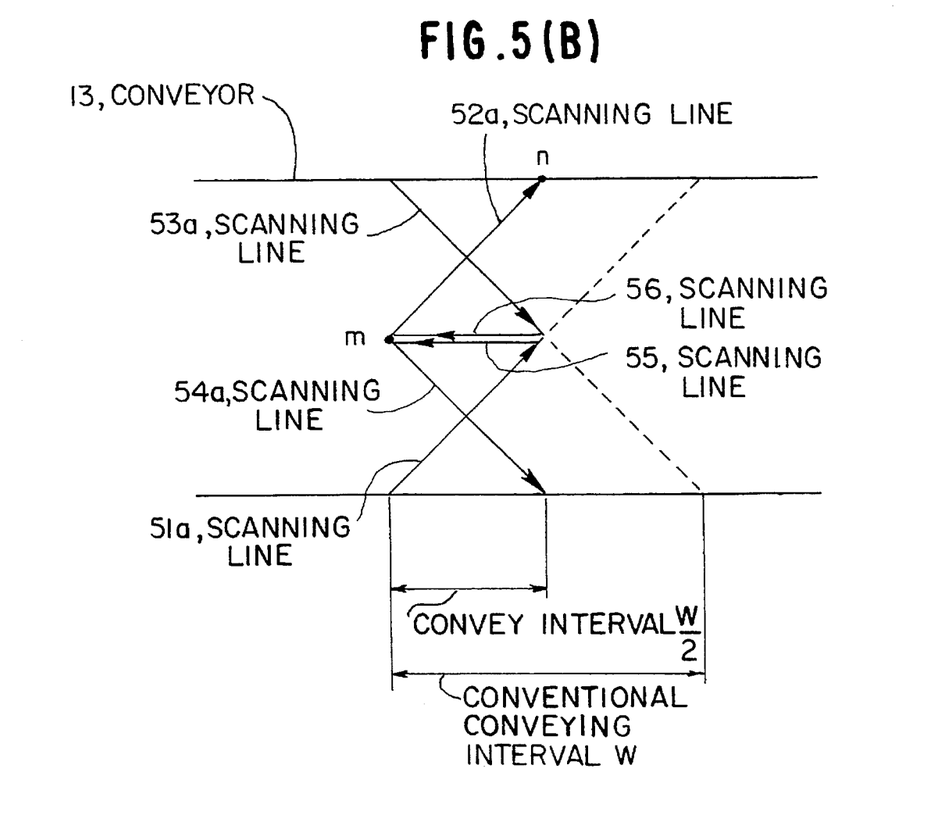

Next, the operation of this embodiment will be described with reference to FIG. 4 and FIGS. 5(A) and 5(B).

The laser beam 42a emitted from the semiconductor laser diode 41a is converged by the lens 2a. The converged laser beam 42a is folded by the mirror 4 toward the polygon mirror 6, and deflected by the rotating polygon mirror 6. The deflected laser beam 42a forms a beam locus 51 on the pattern forming mirror 7, and the laser beam 42a reflected at the beam locus 51 forms a scanning line 51a on the surface of the object 14 that is conveyed on the conveyor 13.

Then, the detector 43 detects that the polygon mirror 6 has been rotated by a prescribed angle, and supplies a sync signal to the switching controller 44. Upon receiving that signal, the switching controller 44 supplies control signals to the semiconductor laser diodes 41a and 41b so as to turn off the output of the semiconductor laser diode 41a and turn on the output of the semiconductor laser diode 41b. Thus, the semiconductor laser diodes 41a and 41b are controlled, i.e., switched in accordance with the control signals.

A scanning line 55 is formed on the surface of the object 14 by the high-speed switching from the semiconductor laser diode 41a to the semiconductor laser diode 41b.

Then, the laser beam 42b emitted from the semiconductor laser diode 41b is converged by the lens 2b. The converged laser beam 42b is folded by the mirror 4 toward the polygon mirror 6, and deflected by the rotating polygon mirror 6. The deflected laser beam 42b forms a beam locus 52 on the pattern forming mirror 7, and then a beam locus 53 on the pattern forming mirror 8. The laser beam 42b reflected at the beam loci 52 and 53 forms scanning lines 52a and 53a on the surface of the object 14, respectively.

Then, the sync signal detector 43 detects that the polygon mirror 6 has been rotated by a prescribed angle, and supplies a sync signal to the switching controller 44. Upon receiving that signal, the switching controller 44 supplies control signals to the semiconductor laser diodes 41a and 41b so as to turn off the output of the semiconductor laser diode 41b and turn on the output of the semiconductor laser diode 41a. Thus, the semiconductor laser diodes 41a and 41b are controlled, i.e., switched in accordance with the control signals.

A scanning line 56 is formed on the surface of the object 14 by the high-speed switching from the semiconductor laser diodes 41b to the semiconductor laser diode 41a.

Then, the laser beam 42a emitted from the semiconductor laser diode 41a is deflected by the rotating polygon mirror 6 in the same manner as in the above operation. The deflected laser beam 42a forms a beam locus 54 on the pattern forming mirror 8, and the laser beam 42a reflected at the beam locus 54 forms a scanning line 54a on the surface of the object 14.

Thus, the operation of forming a combined scanning pattern 45 by one facet of the polygon mirror 6 is finished. As a result, the combined scanning pattern 45 is formed which consists of a scanning pattern of scanning lines 51a, 52a and 55 and a scanning pattern of scanning lines 53a, 54a and 56. That is, in this embodiment, the high-speed switching control on the semiconductor laser diodes 41a and 41b is performed twice during the laser beam deflection by one facet of the polygon mirror 6.

The reflected (scattered) light produced by scanning the bar code symbol 15 omnidirectionally by means of the combined scanning pattern 45 is reflected by the pattern forming mirrors 7 and 8, the polygon mirror 6, and then the aperture mirror 5. The scattered light thus reflected is condensed by the condenser lens 9, and then subjected to photoelectric conversion in the photoelectric converter 10. A signal obtained by the photoelectric conversion is amplified by the video amplifier 11, and decoded by the decoder 12.

By making the on/off switching speed of the semiconductor laser diodes 41a and 41b sufficiently faster compared with the width of a video signal pulse corresponding to the narrowest bar (or space) of the bar code symbol 15, the scanning lines 51a and 52a as well as the scanning lines 53a and 54a of the scanning lines constituting the combined scanning pattern 45 can be regarded as a continuous straight line. That is, the scanning lines 55 and 56 can be disregarded. This allows even a bar code symbol wider than a straight scanning line length mn to be read at one time as in the case of using a single large cross pattern. Therefore, the objects 14 to be read can be conveyed with conveying intervals W/2, i.e., ½ of the conveying intervals W in the case of using only one laser light source.

Next, a description will be made on methods of detecting a deflecting angle of the laser beam deflected by the deflecting means, for example, detecting the rotational angle of the polygon mirror 6.

Figure 6:
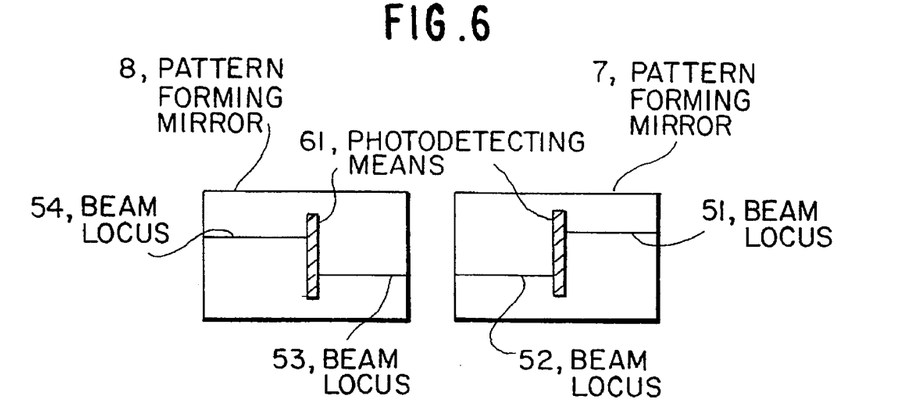
FIGS. 6–8 show means for detecting the rotational angle of a polygon mirror in the first embodiment of the invention.

As shown in FIG. 6, a photodetecting means 61, e.g., a photodiode, is provided at a predetermined position of each of the pattern forming mirrors 7 and 8. For example, when two laser light sources are used, the photodetecting means 61 is provided at the center of each of the pattern forming mirror 7 and 8. The laser beam 42a or 42b is detected by the photodetecting means 61. Based on the detection result, the switching controller 44 on/off-controls the semiconductor laser diodes 41a and 41b.

Figure 7:
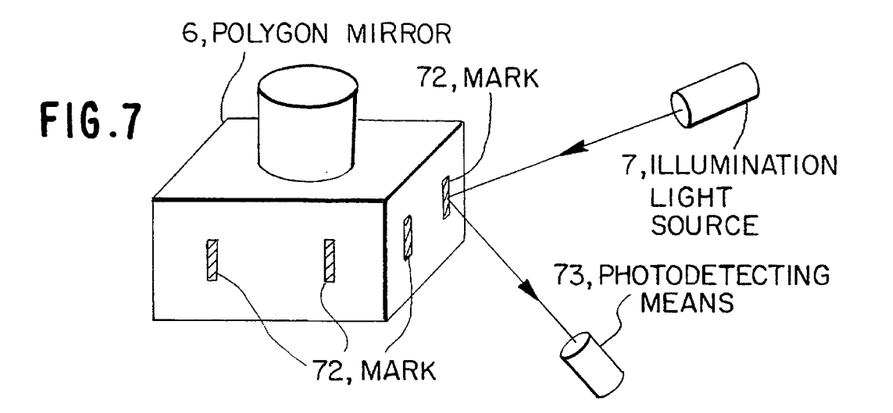

FIG. 7 shows another method of detecting the rotational angle of the polygon mirror 6. An illumination light source 71 is provided which illuminates all the facets of the polygon mirror 6 in turn. Marks 72 for reflecting the illumination light from the illumination light source 71 are provided at predetermined positions on each facet of the polygon mirror 6. Further provided is a photodetecting means 73 for detecting light reflected from the marks 72. By detecting the light reflected from the marks 72, the photodetecting means 73 detects the rotational angle of the polygon mirror 6. Based on the detection result, the switching controller 44 on/off-controls the semiconductor laser diodes 41a and 41b. Instead of the illumination light emitted from the illumination light source 71, the laser beams emitted from the semiconductor laser diodes 41a and 41b may be used to illuminate the marks 72.

Figure 8:
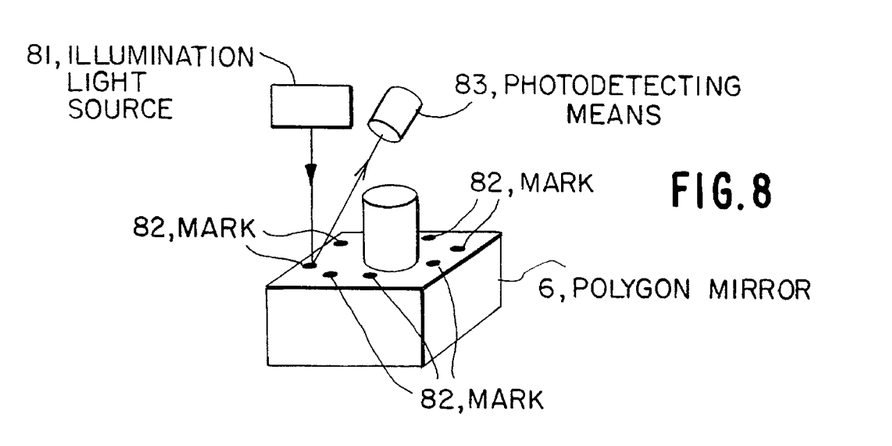

FIG. 8 shows a further method of detecting the rotational angle of the polygon mirror 6. An illumination light source 81 which illuminates the top face of the polygon mirror 6 at a certain position. Marks 82 for reflecting the illumination light emitted from the illumination light source 81 are provided at predetermined positions on the top face of the polygon mirror 6. Further provided is a photodetecting means 83 for detecting light reflected from the marks 82. By detecting the light reflected from the marks 82, the photodetecting means 83 detects the rotational angle of the polygon mirror 6. Based on the detection result, the switching controller 44 on/off-controls the semiconductor laser diodes 41a and 41b. The illumination light source 81, marks 82 and photodetecting means 83 may be provided on the bottom face side of the polygon mirror 6.

Figure 9:
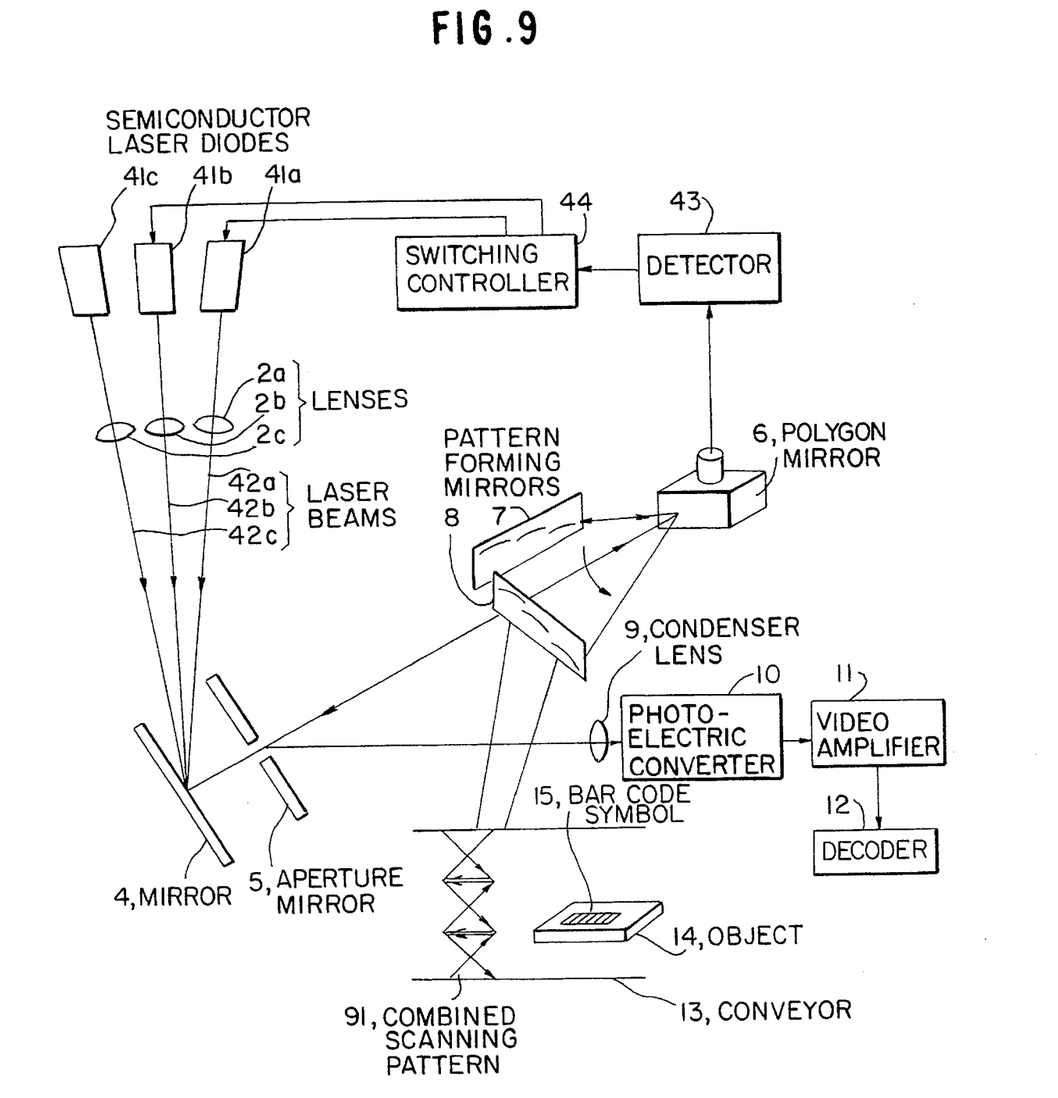
FIG. 9 shows a configuration of a bar code reader according to a second embodiment of the invention.
Figures 10A, 10B:
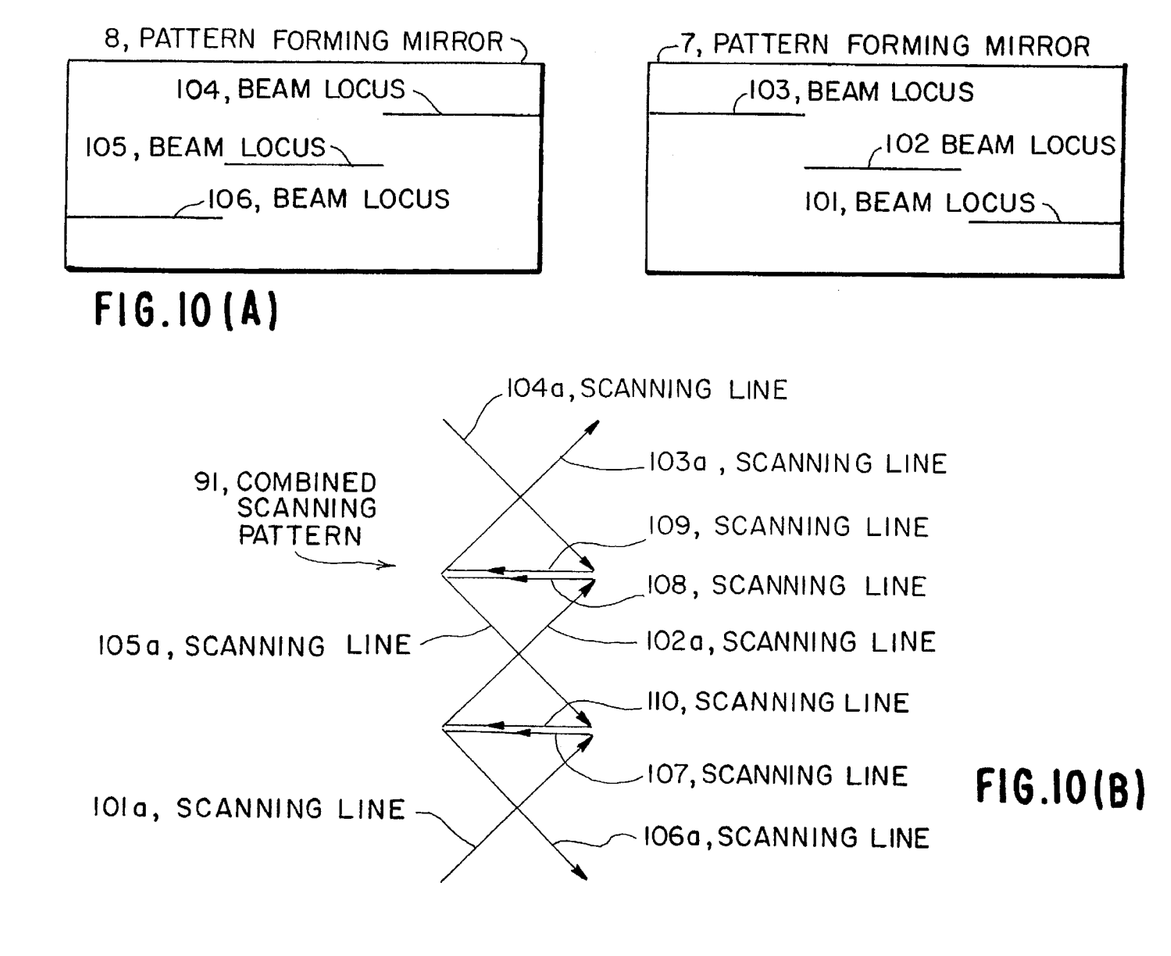
FIGS. 10(A) and 10(B) illustrate a process of forming a combined scanning pattern in the second embodiment of the invention.

While the two semiconductor laser diodes are used in the above embodiment, in the invention any number of semiconductor laser diodes may be used to shorten the conveying intervals. Referring to FIG. 9 and FIGS. 10(A) and 10(B), a description will be made of another embodiment in which three semiconductor laser diodes are used.

In the embodiment shown in FIG. 9, a semiconductor laser diode 41c is added to the embodiment of FIG. 4, and a combined scanning pattern 91, which is formed on the surface of the object 14, consists of three cross patterns. In this embodiment, the three semiconductor laser diodes 41a–41c are on/off-controlled in a predetermined order based on control signals supplied from the switching controller 44.

Referring to FIGS. 10(A) and 10(B), first a beam locus 101 is drawn on the pattern forming mirror 7 by the laser beam 42a emitted from the semiconductor laser diode 41a. In this operation, the semiconductor laser diodes 41b and 41c are in an off state. The laser beam 42a and 42b reflected at the beam locus 101 drawn on the pattern forming mirror 7 forms a scanning line 101a on the surface of the object 14. Detecting that the polygon mirror 6 has been rotated by a predetermined angle, the detector 43 supplies a detection signal to the switching controller 44. Upon receiving the detection signal, the switching controller 44 turns off the output of the semiconductor laser diode 41a, and turns on the output of the semiconductor laser diode 41b. A scanning line 107 is formed on the surface of the object 14 by the high-speed switching from the semiconductor laser diode 41a to the semiconductor laser diode 41b. In this manner, as the semiconductor laser diodes are driven so as to be switched in the order of 41a→41b→41c→41b→41a during an operation in connection with one reflecting face of the polygon mirror 6, a combined scanning pattern 91 consisting of three cross patterns is formed on the surface of the object 14. The scanning lines 107–110 are formed when the drives of the three semiconductor laser diodes are switched, and can be disregarded by making the switching speed of the semiconductor laser diodes sufficiently faster compared with the width of a video signal pulse corresponding to the thinnest bar or space of the bar code symbol 15, as described above. That is, where the three semiconductor laser diodes are used, the scanning lines 101a, 102a and 103a as well as the scanning lines 104a, 105a and 106a can be regarded as a single straight line. Therefore, the conveying intervals can be reduced to W/3 without decreasing the scanning width.

The above description is intended to describe the embodiments of the invention. It is noted that each component can be replaced by another component having the same function, and that the technical scope of the invention is in no way limited to the contents described above.

What is claimed is:

1. A bar code reader comprising:

a plurality of semiconductor laser diodes for emitting respective laser beams having optical axes extending in different directions;

a first sending means for sending the laser beam emitted from said semiconductor laser diodes while converging it;

deflecting means for deflecting the laser beam sent from said first sending means;

pattern forming means for reflecting the laser beam deflected by the deflecting means, to thereby form a combined scanning pattern;

a second sending means for sending scattered light produced by scanning a bar code symbol by means of the combined scanning pattern while condensing the scattered light;

photoelectric converting means for subjecting the condensed scattered light to photoelectric conversion;

decoding means for decoding a signal produced by the photoelectric conversion;

detecting means for detecting a deflection angle of the laser beam deflected by the deflecting means; and switching means for switching between drives of said plurality of semiconductor laser diodes based on a detection result of said detecting means.

2. The bar code reader, as claimed in claim 1, wherein the drives of said plurality of semiconductor laser diodes are switched at a time sufficiently shorter compared with a width of a video signal pulse corresponding to a narrowest bar or space of the bar code symbol.

3. The bar code reader, as claimed in claim 1, wherein said deflecting means is provided at least one reflecting surface for reflecting the laser beam sent from said first sending means.

4. The bar code reader, as claimed in claim 1, wherein said deflecting means is a mirror mounted on a galvanometer.

5. The bar code reader, as claimed in claim 1, wherein said deflecting means is a polygon mirror, for deflecting the laser beam sent from said first sending means by mirrors provided on side facets of said polygon mirror.

6. The bar code reader, as claimed in claim 4, wherein the drives of said plurality of semiconductor laser diodes are switched at least twice while the laser beam is deflected by the surface of said mirror mounted on the galvanometer.

7. The bar code reader, as claimed in claim 5, wherein the drives of said plurality of semiconductor laser diodes are switched at least twice while the laser beam is deflected by one of the side facets of said polygon mirror.

8. The bar code reader, as claimed in claim 1, wherein the combined scanning pattern includes a plurality of cross patterns that are arranged as connected without being overlapped with each other.

9. The bar code reader, as claimed in claim 8, wherein the number of the cross patterns is equal to that of said semiconductor laser diodes.

10. The bar code reader, as claimed in claim 1, wherein said pattern forming means includes a plurality of mirrors.

11. The bar code reader, as claimed in claim 1, wherein said pattern forming means is at least two mirrors that are mounted at different angles.

12. The bar code reader, as claimed in claim 4, wherein beam loci are drawn by the laser beams emitted from said plurality of semiconductor laser diodes on one piece of said pattern forming means during laser beam scanning by the surface of said mirror mounted on the galvanometer.

13. The bar code reader, as claimed in claim 5, wherein beam loci are drawn by the laser beams emitted from said plurality of semiconductor laser diodes on one piece of said pattern forming means during laser beam scanning by one of the facets of said polygon mirror.

14. The bar code reader, as claimed in claim 1, wherein said switching means switches between the drives of said plurality of semiconductor laser diodes in a predetermined order.

15. The bar code reader, as claimed in claim 1, wherein where said plurality of semiconductor laser diodes are two semiconductor laser diodes, said switching means controls said two semiconductor laser diodes so as to drive them alternately.

16. The bar code reader, as claimed in claim 1, further comprising:

photodetecting means for detecting the laser beam emitted from said plurality of semiconductor laser diodes is provided at a predetermined position on said pattern forming means, wherein said detecting means detects the deflecting angle of the laser beam deflected by deflecting means based on a detection result of said photodetecting means.

17. The bar code reader, as claimed in claim 3, further comprising:

a mark provided at a predetermined position on the reflecting surface of said deflecting means; and photodetecting means for detecting light reflected from said mark, wherein the detecting means detects the deflecting angle of the laser beam deflected by said deflecting means based on a detection result of said photodetecting means.

18. The bar code reader, as claimed in claim 17, further comprising an illumination light source for illuminating the reflecting surface of deflecting means with illumination light, wherein said photodetecting means detects light reflected from the mark being illuminated with the illumination light.

19. The bar code reader, as claimed in claim 5, further comprising:

an illumination light source for illuminating a top or bottom face of said polygon mirror with illumination light;

a mark provided at a predetermined position on the top or bottom face of said polygon mirror; and photodetecting means for detecting light reflected from said mark being illuminated with the illumination light, wherein said detecting means detects the rotational angle of said polygon mirror based on a detection result of said photodetecting means.

\* \* \* \* \*